United States Patent Office 3,328,161
Patented June 27, 1967

3,328,161
PROCESS FOR REDUCING IRON ORE PELLETS
Hans Rausch, Oberursel, Taunus, Günter Heitmann, Frankfurt am Main, and Wolfgang Janke, Oberursel, Taunus, Germany, assignors to Metallgesellschaft Aktiengesellschaft, Frankfurt am Main, Germany
No Drawing. Filed Dec. 9, 1963, Ser. No. 332,992
Claims priority, application Germany, Dec. 7, 1962, M 55,045
6 Claims. (Cl. 75—33)

This invention relates to a process for reducing iron ore and particularly for the reduction of the ore in the manufacture of raw iron.

Several methods are known for reducing iron oxide ores with the aid of carbon-containing solid fuels to form a product composed, at least partially, of metallic iron. This product in a following step is then melted down into metallic iron in a furnace such as a cupola furnace, an electric furnace, or the like.

The earliest group of such methods has the common distinguishing feature in that the fine-grained iron oxide ores and a solid reduction material containing carbon are pressed together and formed into pre-shaped bodies, such as briquettes, granules, pellets, or the like. These bodies are then reduced in such a way that carbon monoxide is formed from the carbon in the reducing material and oxygen which comes from either the iron oxide ores or from a gas jet containing oxygen, and this carbon monoxide has a reducing effect on the iron oxide.

However, such methods have not come into general use because, as a practical matter, they require a large amount of high quality reduction material, such as coke or anthracite coal, which in quantity is as great as that needed for the direct reduction of the ores in a blast furnace. Consequently, this process offers no technical or economical advantages over the direct reduction of the ores in a blast furnace. Furthermore, the physical stability of the pre-shaped bodies made from iron ores mixed with a quantity of carbon-containing materials sufficient for the complete reduction of the ores is so low that the pre-shaped bodies very often disintegrate while being reduced.

In a quite recently developed process, the physical stability of the pre-shaped bodies is increased by forming round granules on a pelletizing disc. These pellets are made of iron ore only. They are then reduced on a bed of carbon-containing solid reduction material by means of a counterflow gas. A high carbon monoxide content is formed in the gas through the reaction between the carbon content in the bed and the oxygen content in the iron oxide pellets and/or the gaseous atmosphere.

This process also has the disadvantage in which it is limited to carbon containing solid reduction material practically free of volatile components if heat losses are to be avoided through the escape of unused volatile components.

Furthermore, such carbon-containing solid reduction materials are the most costly because, as a practical matter, only coke or anthracite coal can be used.

A heretofore unpublished proposal suggests the use of cheaper fuels having an appreciable content of volatile components for the initial reduction of iron oxides to a product composed at least partially of metallic iron. These cheaper fuels are effectively used when they are introduced into a rotary furnace, already charged with bodies of iron oxide ores and relatively volatile free fuel, such as recycled carbonized coal from the discharge of the kiln at a point sufficiently remote from the discharge end of the furnace and at which point the fuels are partially carbonized and partially are used to reduce the iron oxides. The excess of fuel discharged from the furnace is separated from the at least partially reduced pellets and is then returned to the furnace at a point in advance of the point where the original fuel had been introduced.

Even though these proposed methods represent certain technical advances over the prior art, they do not make it possible to introduce the entire quantity of fuel exclusively in the form of fuel containing large quantities of volatile components and which is necessary for the reduction of the oxides. The maximum quantity of such bituminous fuel which can be used for the prior processes is limited by the requirement, that not more volatile components should be formed by their carbonization than can be used by subsequent burning for covering the heat requirements of the reduction of the iron oxides if loss of heat along with the waste exhaust gases is to be avoided.

The object of this invention is to improve upon the prior art processes and by means of which produce a product composed at least partially of metallic iron by using exclusively cheaper fuels which can have any desired amount of volatile components.

In general, the process of this invention is to incorporate a portion of the fuel required for the partial reduction of the oxides in the pre-shaped bodies themselves which are formed from fine iron oxide particles, using exclusively cheap fuel for this purpose, there being no upper limit for its permissible content on volatile components. The fuel incorporated into the iron oxide bodies must be ground up to a degree suitable for pelletizing, e.g. so that the mixture of ground up iron oxide and coal is 80% below 0.06 mm. This admixed or incorporated fuel performs a large amount of the work of reducing the iron oxides, and preferably as much as from 40 to 60% of the entire reduction.

Since, in this invention, only a part of the reduction material required for the full reduction of the iron oxide bodies is admixed with the bodies instead of the entire amount of material required to effect reduction, the physical stability of the pre-shaped bodies is considerably higher than that of pre-shaped bodies which have incorporated therein the entire amount of material required for the reduction of the iron oxides. It has been unexpectedly found that the physical stability of the pre-shaped bodies of this invention and which contain only a portion of the material needed for full reduction of the oxides is considerably higher than it should be according to the formula for admixing the reduction material with the iron oxides. Also, it has been unexpectedly found that, while the bodies are being reduced in a rotary furnace, the gaseous components driven off during low temperature carbonization are practically 100% effective as a reduction means. This is in spite of the fact that, in the prior art processes heretofore known, in the reduction of iron oxides with gaseous fuels, substantially only $H_2$ and CO are effective as the means of reduction, while all other gaseous reduction means, such as $CH_4$ or higher hydrocarbons, are practically noneffective as a means of reduction. For this reason, heretofore, numerous proposals have been made for cracking gaseous hydrocarbons by reacting them with oxygen and/or water vapor into CO and $H_2$ before they are used for reduction purposes.

According to this invention, the bodies, after being partially reduced by the admixed carbon-containing reduction material, are more fully reduced in the last third portion of the furnace adjacent the discharge end thereof by means of a bed of carbon-containing solid reduction material. The material for forming this bed is advantageously not introduced into the rotary furnace in advance of the fiinal zone mainly to not burden the first zone of the furnace and to avoid the undesirable Boudouard reaction in the preheat zone. Nevertheless, in principle, it is possible to introduce both the pre-shaped iron oxide bodies and the material for forming the fuel bed or part of this fuel into the entrance end of the furnace. However, in this case, it is advantageous to use exclusively for the material for forming the bed a fuel which contains very little or no volatile components in order to avoid loss of heat along with the waste gas.

As contrasted to the fuel admixed to the preshaped bodies, the gaseous products driven off from the fuel bed in which the bodies are imbedded have an almost nonexistent direct reducing effect on the iron oxides. Therefore, their energy content is used only for the heat resulting from the burning of the gases to cover the endothermic heat needed for the reduction of the iron oxides.

In a preferred form of this invention, the amount of fuel containing the volatile components, which is admixed with the shaped bodies, is adjusted to the amount of the same fuel used for the external fuel bed so, that the total amount of volatile components driven off from the fuel of the external bed during its carbonization is just sufficient to provide the heat requirements of the process by being burnt. For example, given a fuel containing by weight about 40% fixed carbon and 37% volatile components, then about 50% of the reduction is accomplished by fuel admixed with the bodies and 50% with fuel from the external bed.

A further feature of this invention lies in that the pre-shaped bodies composed of iron oxides admixed with solid reduction materials containing volatile components are formed as round pellets on a pelletizing disc and these green pellets are fed directly into the rotary furnace without being either pre-dried or heat hardened.

A further feature of this invention lies in that the physical stability of the wet green pellets is increased by the addition of an active earth, such as bentonite, montmorillonite and the like.

A further feature of this invention lies in that it is possible to control the amount of residual carbon present in the product discharged from the rotary furnace. This product, consisting of a mixture of reduced iron ore pellets, and residual external carbon can contain residual carbon sufficient to completely reduce the end product and to impart to it the desired carbon content, with the energy required for the smelting supplied electrically rather than by the combustion of the residual carbon. In this case, it is of advantage that the size of the fuel forming the external bed is larger than is usual for direct reduction, i.e. 0.1 to 20 mm., preferably 0.1 to 15 mm., instead of the usual 0.1 to 5 mm.

An especial advantage of this invention lies in that it can be used also for inferior ores such as those having a total iron content of less than 60% and which cannot be economically processed in any other way, since partially reduced bodies are eventually melted down in a shaft furnace with the simultaneous formation of slag containing the impurities.

The dust which is carried away with the waste gases of the rotary furnace is separated in a conventional dust precipitating apparatus, such as a cyclone, and then according to its carbon content is either admixed with the fresh green pre-shaped bodies or is used as the outer shell for the same.

The means by which the objects of the invention are obtained are disclosed more fully in the following examples, of which Example 1 concerns the prior state of art, Example 2 the invention and Example 3 another comparative test comparing the results achieved by the invention and by a known process.

*Example 1 (prior state of art)*

An iron ore was ground up to pelletising fineness i.e. 80% less than 60 micron and was mixed with 7 to 8% of its weight with cyclone dust collected in the process. The mixture was pelletised on a palletising disc, while being sprayed with water, to from pellets of a diameter of about 15 mm.±2 mm.

The iron ore used had a total iron content of 47% and an ignition loss of about 11%. The pellets containing about 15% water were charged at the rate of 144 kg./h. into a rotary furnace which was provided with mantle burners and charging means for coal in the mantle. The length of the furnace was 7.83 metres and its inner diameter 0.5 metre. The coal charging means was 5.25 meters from that end of the furnace into which the pellets were charged. The pellets were dried and brought to reduction temperature of 1100° C. in the heating part of the furnace i.e. about the first third of its length. 42 kg./h. of a bituminous coal rich in volatiles were fed into the furnace by the coal charging means, the coal analysing 46% fixed carbon, 9% ash and 37% volatiles. The total input of coal was 0.85 kg. of coal per kg. iron. The volatile constituents of the coal were driven off and, together with the carbon monoxide derived from the reduction by means of air introduced through the mantle burners, were burned thereby heating the charge and satisfying the energy requirements, including the heat of reduction and the heat losses. An additional heating of the rotary kiln, i.e. by town gas or oil was not necessary. The amount of the volatiles driven off was so great, that together with the carbon monoxide developed by the reduction it could not be used up completely in heating the charge, and the waste gas contained between 5 and 10% of unburned combustible volatile constituents.

The product discharged from the furnace consisted of 90 kg./h. pellets having a total iron content of 59.6% and a content of metallic iron of 20.9%, as well as 11.4 kg./h. surplus coal with a content of 70% fixed carbon and 2% volatiles. These figures show that the degree of metallisation was 35%, corresponding to an oxygen elimination of 50% and a carbon consumption of 0.0113 kg. fixed carbon per kg. metallic iron. The total product discharged from the furnace, i.e. comprising pre-reduced pellets and surplus coal, was melted down to pig iron in an electric furnace. For completing the reduction and for introducing the desired amount of carbon into the pig iron 0.191 kg. fixed carbon per kg. iron must be present in the product discharged from the furnace. Therefore another 0.041 kg. fixed carbon per kg. iron must be added to the product discharged from the rotary kiln prior to charging the product into the electric furnace.

*Example 2 (according to the invention)*

The same ore as in Example 1 was ground to the same fineness, i.e. 80% smaller than 60 micron and was mixed with the same coal as used in Example 1. Contrary to Example 1, this coal was ground prior to its admixture to the ore to the same fineness as the ore, i.e. 80% smaller than 60 microns. The mixing ratio of iron ore and ground coal was 100:12. This mixture of iron and coal was pelletised on a pelletising disc to pellets of the same diameter as in Example 1, i.e. to pellets with a diameter of 15 mm.±2 mm. 150 kg./h. of the pellets containing 15% of moisture, just as in Example 1, but also incorporating 16.3 kg./h. coal were transferred from the first pelletising disc to a second one on which they were coated with a layer of cyclone dust. The amount of cyclone dust was 7 to 8% by weight and corresponded to the amount of cyclone dust recovered from waste gases discharged from the rotary kiln.

The pellets were brought to the same reduction temperature of 1100° C. in the rotary kiln, then reduced by means of the coal incorporated in them and further reduced in the following part of the rotary kiln. In order to effect the desired degree of reduction the same coal as was bound in the pellets but not ground up to this fineness was introduced into the rotary kiln at a rate of 25 kg./h. by means of the coal-charging means in the last third of the furnace length, the particle size of this coal being 0.1 to 15 mm. The total amount of coal charged to the furnace was therefore 16.3+25=41.3 kg./h. The amount of coal charged was therefore approximately equal but a little lower than the amount charged in Example 1.

The volatile constituents of the coal were driven off under the conditions prevailing in the rotary furnace. The volatiles contained in the coal incorporated in the pellets were used predominantly for reduction, whereas the volatiles driven off from the coal of the external bed were burned together with surplus carbon monoxide in the heating zone of the furnace and thereby utilised for heating the charge. In this way the amount of volatiles driven off which could not be used for reduction, could be adjusted so that the combustion of the volatiles provide just sufficient heat for covering the heat requirements of the process and no unusuable surplus of such volatiles was present in the waste gas which was therefore practically free of combustible constituents, i.e. it contained less than 1% of these constituents.

The total amount of coal charged to the furnace, i.e. the coal incorporated in the pellets, the coal forming the external bed and the coal contained in the cyclone dust, was 0.85 kg. of coal per kg. iron content in the charge, just as in Example 1. Contrary to Example 1 the degree of metallisation was 55% at practically the same, even a little lower coal consumption, corresponding to an oxygen elimination of 66%, whereas in Example 1 the metallisation degree was only 35% and the oxygen elimination only 50%. The total products discharged including the carbon incorporated in the pellets as well as the carbon of the external bed corresponded to 0.15 kg. fixed carbon per kg. metallic iron, i.e. to the amount of carbon necessary and sufficient for completion of the reduction and to incorporate the amount of carbon necessary to produce pig iron. The total consumption was less than in Example 1, as it was only 0.0071 kg. fixed carbon per kg. metallic iron.

The product discharged from the rotary kiln was not cooled, but charged without appreciable cooling at a temperature of 700° C. directly into an electric furnace. No additional reducing agent was required for the production of pig iron in the subsequent furnace.

*Example 3 (another comparative test)*

The purpose of this test was to find out the coal consumption necessary in order to get the same high degree of metallisation and degree of reduction as in Example 2 when working according to the known process of Example 1.

Therefore the process was repeated, but no coal was incorporated in the pellets, just as in Example 1, and the pellets were covered with a layer of cyclone dust as in Example 2. The same coal as used in Examples 1 and 2 was charged by the charging means in an amount of 25 kg./h. The pellets were charged in an amount of 144 kg./h. together with 40 kg./h. fresh coal and 15 kg./h. carbonised recycled coal, the latter having been recovered from the surplus contained in the discharged product. The recycling of the carbonised coal was necessary, because in order to achieve the same high degree of reduction as was obtained in Example 2, much more coal had to be added to the initial charge. Therefore the discharged product still contained a surplus of carbonised coal which was unnecessary for the final reduction in the following electric furnace and which had to be used up in some way. The total amount of coal charged, i.e. including the carbon contained in the cyclone dust and the coal of the external bed was 0.50 kg. of coal per kg. of iron.

0.32 kg. fixed carbon per kg. iron of this amount could be recovered from the product discharged from the rotary kiln and recycled into it. The effective coal consumption was therefore 40+25=65 kg./h. of fresh coal corresponding to a coal consumption of 0.0232 kg. coal per kg. of metallised iron. The mixture discharged from the rotary kiln was cooled in a non-oxidising atmosphere and separated by classification and magnetic separation into pre-reduced pellets and dusts on the one hand and into surplus coal on the other hand. The degree of metallisation of the pre-reduced pellets was 55% as in Example 2, i.e. 66% of the oxygen content originally bound to the iron could be eliminated. The total discharged product still contained 0.3 kg. fixed carbon per kg. of iron, i.e. the fixed carbon content of the discharged product was twice as high as in Example 2. Therefore the total discharged product could not be charged through the electrical furnace without prior separation. Therefore the separation into a magnetic part (pre-reduced pellets plus dust) and into a non-magnetic part (carbonised surplus coal plus ash) was necessary. 0.15 kg. fixed carbon per kg. total iron of the carbonised coal were added to the pre-reduced pellets. This amount of fixed carbon corresponded to the amount of carbon necessary to complete the reduction and to incorporate the necessary amount of carbon into the finished product, just as in Example 2. This mixture of pre-reduced pellets and added coal was charged into the electric furnace. The remaining 0.15 kg. fixed carbon per kg. iron was added as recycle coal to the charge of the rotary kiln.

Having now described the means by which the objects of the invention are obtained, we claim:

1. A process for reducing green pellets formed from finely ground iron oxide ore to pellets composed in part of metallic iron in an external bed of solid carbonaceous reduction material in a rotary furnace, comprising incorporating in said green pellets from 40 to 60% of the amount of carbonaceous reducing material theoretically necessary for the complete reduction of the iron oxides in said pellets, said incorporated material containing substantial amounts of volatile elements and being ground to substantially the same degree of fineness as the iron oxides in said pellets, forming said external bed in approximately the last third portion of said furnace, igniting said bed, introducing the green pellets into the first portion of said furnace to heat the pellets by the combustion gases coming from said bed, and partially reducing said pellets to said metallic iron at a temperature above 900° C. in the following portions of the furnace by the heat and the CO produced from the carbonaceous material in said pellets and by the additional heat of the combustion gases from said bed.

2. A process as in claim 1, said portion of said solid reducing material forming the bed producing only enough burnable volatiles for furnishing the additional heat required for the reduction of said ores.

3. A process as in claim 2, further comprising using only a portion of the entire amount of said reduction material in said pellets and said bed to leave a residual amount of material in the discharge product sufficient for a later complete reduction of said ores.

4. A process as in claim 3, further comprising completely reducing the iron oxides in said pellets in an electric furnace following said at least partial reduction in said rotary furnace.

5. A process as in claim 4, further comprising admixing an active earth with said iron ore pellets for increasing the stability of said green pellets.

6. A process as in claim 5, further comprising said bed being composed of coal 0.1 to 20.0 mm. in size.

(References on following page)

References Cited

UNITED STATES PATENTS

| | | | |
|---|---|---|---|
| 1,871,848 | 8/1932 | Gustafson | 73—33 |
| 2,014,873 | 9/1935 | Wildman | 75—33 |
| 2,877,108 | 3/1959 | Smith | 75—36 |
| 3,072,474 | 1/1963 | Atkinson et al. | 75—33 X |
| 3,197,303 | 7/1965 | Collin | 75—33 |
| 3,206,299 | 9/1965 | Senior et al. | 75—36 X |
| 3,219,436 | 11/1965 | Heitmann et al. | 75—33 X |
| 3,224,871 | 12/1965 | Collin | 75—36 X |

FOREIGN PATENTS

| | | |
|---|---|---|
| 861,477 | 2/1961 | Great Britain. |

DAVID L. RECK, *Primary Examiner.*

HYLAND BIZOT, *Examiner.*

H. W. TARRING, *Assistant Examiner.*